United States Patent [19]
Weber

[11] 3,809,852
[45] May 7, 1974

[54] ELECTRIC DISCHARGE MACHINE WITH MECHANISM FOR ORBITING THE ELECTRODE ON A POLYGONAL PATH

[76] Inventor: John M. Weber, 630 Colgate Rd., Colgate, Wis. 53017

[22] Filed: Nov. 16, 1972

[21] Appl. No.: 307,323

Related U.S. Application Data
[63] Continuation-in-part of Ser. No. 138,888, April 30, 1971, abandoned.

[52] U.S. Cl............................................. 219/69 V
[51] Int. Cl.............................................. B23k 9/16
[58] Field of Search....................... 219/69 V, 69 G

[56] References Cited
UNITED STATES PATENTS
3,539,754  11/1970  Furze et al...................... 219/69 V
3,135,852  6/1964  Bentley et al.................... 219/69 V Primary Examiner—J. V. Truhe
Assistant Examiner—Hugh D. Jaeger
Attorney, Agent, or Firm—Wheeler, Morsell, House & Wheeler

[57] ABSTRACT

Electrical discharge machine electrode holder, drive and control mechanism for orbiting the electrode on a regular polygonal path with straight sides and angular corners transverse to its path of advance with respect to a workpiece. The control apparatus gradually reduces the size of the orbit path in the course of electrode advance. This eliminates the need for more than one electrode as the workpiece cavity deepens. All rough and finished cuts may be made with the same electrode. The electrode is mounted on a shuttle block with drive means for intermittently driving the block and electrode with rectilinear motion along the straight sides of the polygonal path and with intervening dwell in the corners of the polygonal path.

9 Claims, 11 Drawing Figures

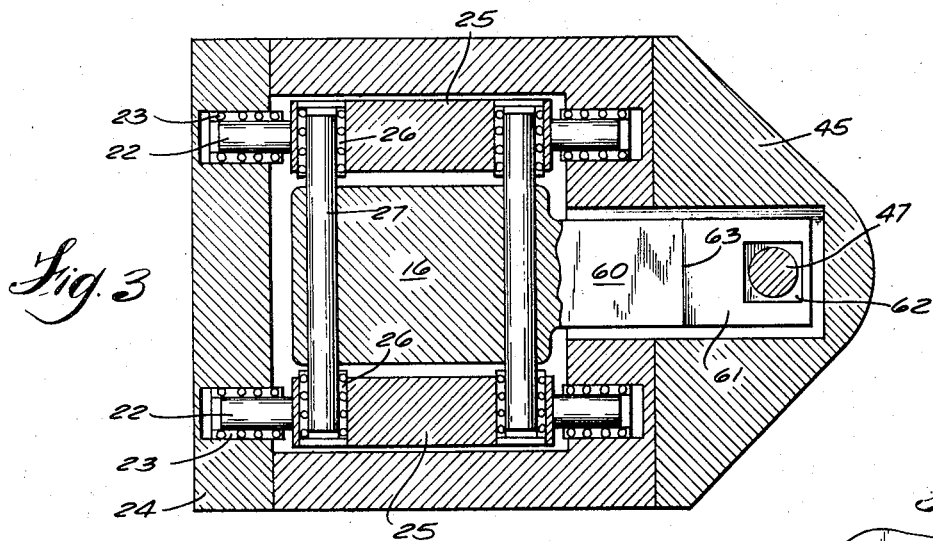
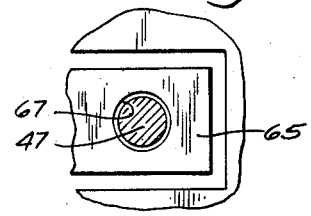
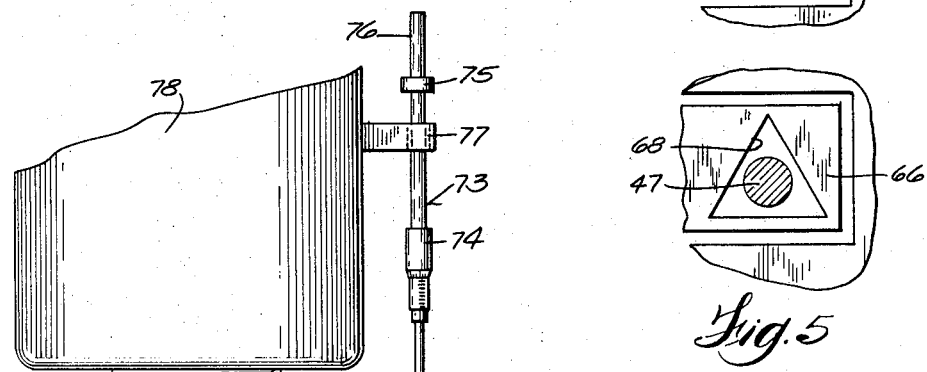
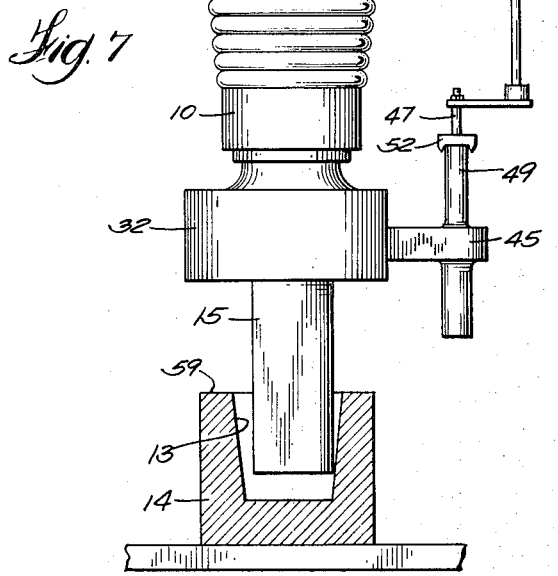
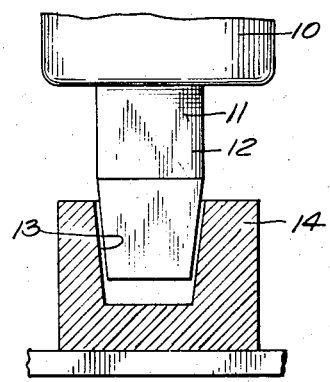

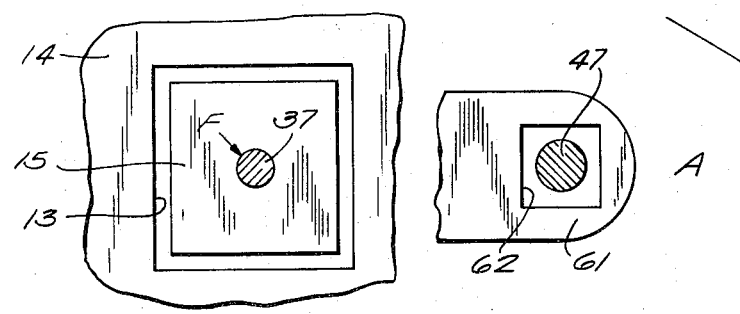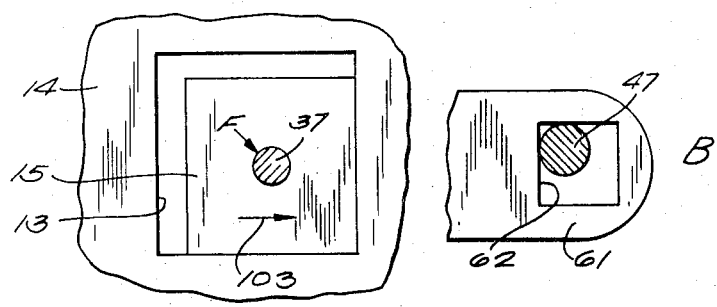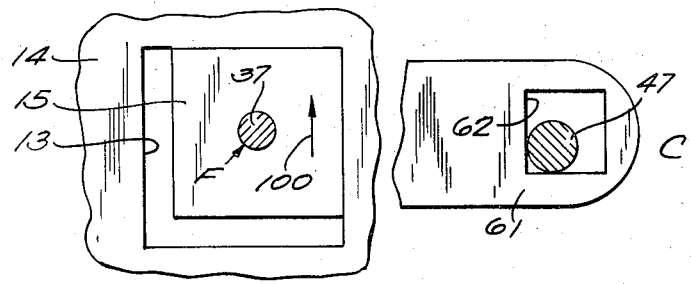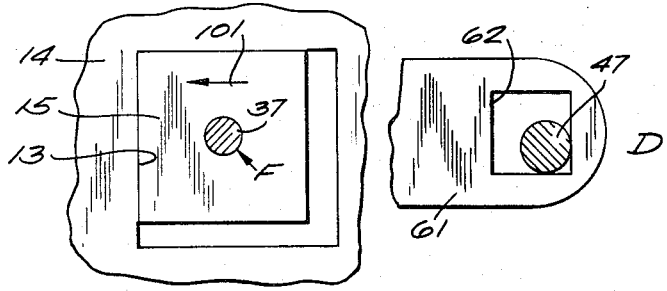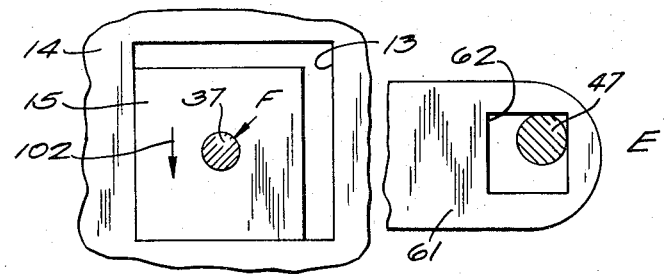
Fig. 11

ELECTRIC DISCHARGE MACHINE WITH MECHANISM FOR ORBITING THE ELECTRODE ON A POLYGONAL PATH

CROSS REFERENCE TO RELATED APPLICATION

This application is a continuation-in-part of my co-pending United States patent application Ser. No. 138,888 filed Apr. 30, 1971, now abandoned.

BACKGROUND OF THE INVENTION

Prior art commercially practiced electric discharge machining typically requires use of several successive electrodes in the course of producing one cavity. Each such electrode must be fully and completely machined with every detail that will appear in the finished cavity, including any tapers. In the usual case where the cavity is formed in a workpiece which will be used as a mold, it is necessary to provide "draft" in the mold to facilitate separating the mold from the finished casting. To produce this draft the electric discharge machine starts its cut at the top of the workpiece with a tapered electrode. Because of electrode erosion wear, it is necessary to replace worn electrodes as many as five times during the course of forming a single cavity to produce a sharply detailed and accurate cavity. The typical result is a downwardly tapered cavity with the required draft. Moreover, even if there is no draft in the cavity, it is typically necessary to change electrodes between an initial rough cut and final finished cut. The finishing electrode is slightly larger than the rough-cut electrode.

The requirement for changing electrodes is costly in terms of electrode expense, particularly where a complex shape is involved.

SUMMARY OF THE INVENTION

The present invention eliminates the need for the successive replacement of electrodes as the cavity is deepened and finished. Only one electrode with non-tapered sides is needed for complete machining of the cavity. It is merely necessary to redress said electrode by cutting or trimming off the end. The single electrode is used to produce any necessary draft and for both rough and finished cuts.

In accordance with the present invention, a single electrode is mounted in an electrode holder which is caused to orbit with intermittent motion in a regular polygonal path with straight sides of equal length and angular corners in a plane transverse to its path of advance with respect to the workpiece. Near the top of a cavity which should have a draft or taper the orbit is relatively large. Control mechanism is provided whereby the orbit is automatically and gradually reduced in size as the cavity is deepened. As the electrode is worn by erosion it is dressed, but it is not discarded and replaced by a substitute electrode. At the bottom of the cavity the electrode no longer orbits. Accordingly, the same electrode is used to produce a downwardly tapered cavity, without the need for substituting new electrodes. To make a finishing cut the operation is repeated with the same electrode which is orbited on slightly greater paths.

In a specific embodiment of the invention, orbit size is controlled by a guide rod which has a vertical taper identical to the desired draft in the workpiece cavity. The electrode holder is mounted on ways for universal transverse movement. The holder has a guide follower which follows the taper of the guide rod so that as the electrode advances with respect to the workpiece its orbit will progressively be reduced in an amount corresponding to the taper on the rod.

For this purpose the guide follower may comprise an arm on the electrode holder which has an orbit defining regular polygonal hole through which the rod is received. The hole is shaped to produce the desired orbit and the edges of the hole slide on the rod. The universally mounted electrode holder is provided with a driver which urges the holder to move in all directions in its transverse plane. However, its actual movement is limited by the configuration of the hole and its coaction with the tapered guide rod. The driver moves the holder intermittently with rectilinear motion along the straight sides of the polygonal path and intervening dwell in the corners of said polygonal path.

In preferred embodiments, the regular polygonal hole has four sides of equal length, thus insuring equal removal of material from all sides of the cavity without drift of the electrode from a true vertical descent axis.

Other objects, features and advantages of the invention will appear from the following disclosure.

DESCRIPTION OF THE DRAWINGS

FIG. 3 is a horizontal cross section taken along the line 3—3 of FIG. 1.

FIG. 4 is a fragmentary plan view showing a circular hole in the guide follower. This configuration would not produce angular corners in the cavity.

FIG. 5 is a fragmentary plan view showing a regular polygonal in the shape of a triangle for the orbit defining hole in the guide follower.

FIG. 6 is a fragmentary elevation showing a typical tapered electrode of the prior art.

FIG. 7 is a fragmentary side elevation of apparatus embodying the present invention, including apparatus for setting the position of the tapered guide rod.

FIGS. 11A to 11E are diagrammatic illustrations of various successive positions of the electrode with respect to its cavity in the workpiece and corresponding positions of the guide rod in the orbit defining hole.

DESCRIPTION OF PREFERRED EMBODIMENTS

Figure 1:
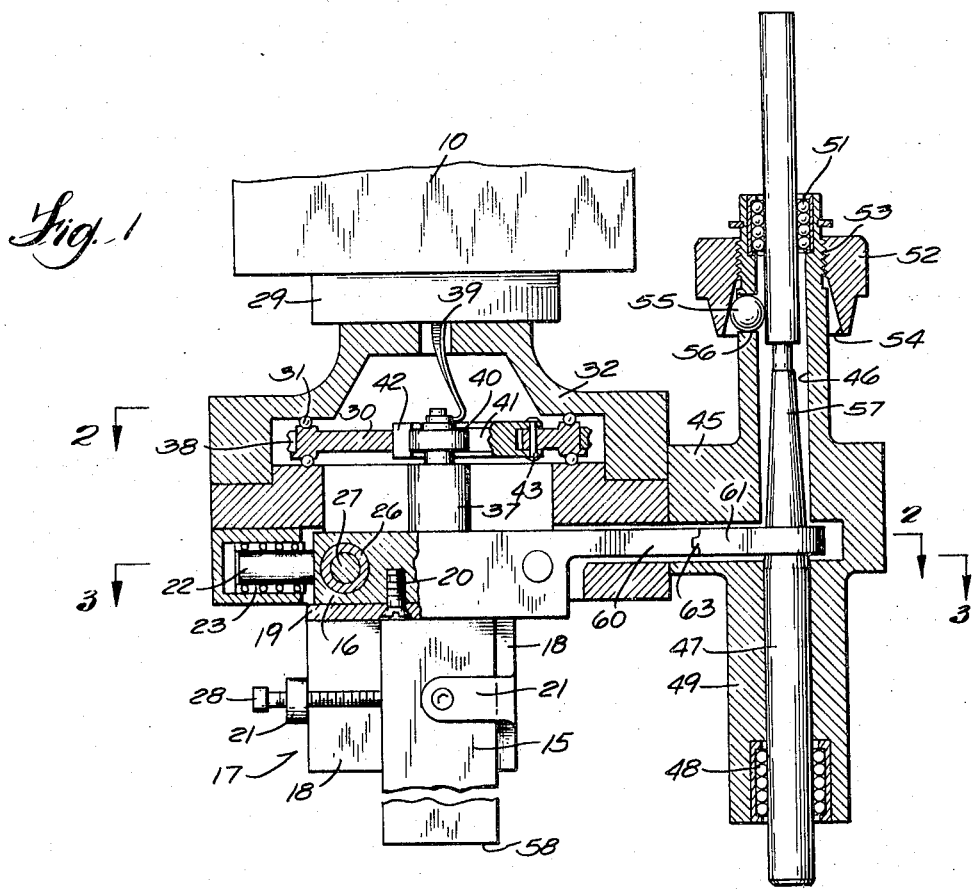
FIG. 1 is a vertical cross section taken through an electric discharge machine electrode holder, drive and control mechanism embodying the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

U.S. Pat. Nos. 3,539,754, 3,322,929 and 3,135,852 show prior art electric discharge machines over which the present invention is an improvement. None of these patents shows apparatus for machining a cavity with angular corners. None shows apparatus for driving the electrode with intermittent rectilinear motion along the straight sides of a polygonal path and intervening dwell in the corners thereof.

FIG. 6 hereof shows a typical commercially available prior art electric discharge machine in which the ram 10 carries an electrode 11 which has its end 12 tapered to create a cavity 13 with corresponding draft in workpiece 14. The apparatus of FIG. 6 usually requires three to six electrodes 11 with the configuration shown in FIG. 6, some of which are roughing electrodes of a smaller size and some of which are finishing electrodes of a larger size. The smallest electrodes are used first. After the cavity is partially formed, the first electrode becomes worn and is removed and is replaced by the next, and so on, until the cavity 13 is complete. The electrode is driven by ram 10 only vertically. The draft or taper of the cavity 13 requires progressive substitution of electrodes as they become eroded.

Even if no draft or taper is required in the workpiece, it is still typically required to use at least two electrodes, one for an initial rought cut and another slightly larger electrode for the finished cut.

Figure 9:
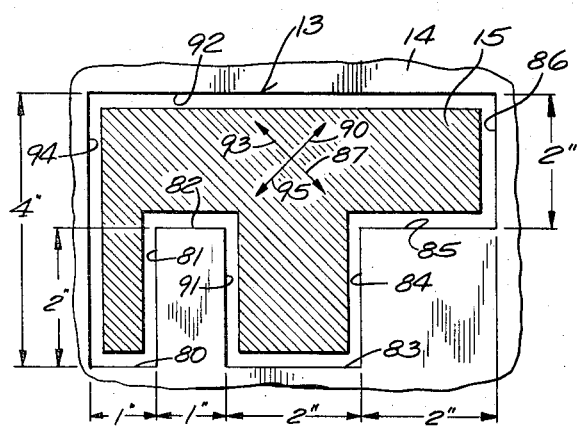
FIG. 9 is a diagrammatic outline in plan of a cavity of irregular shape, with similarly configured electrode therein.

In accordance with the present invention, a tapered cavity 13 is formed in a workpiece 14 with only a single parallel-sided electrode 15. As will be appreciated, different cavity shapes or cross sections may be formed, in accordance with the shape of the electrode. FIG. 9 illustrates one possible irregular cross section through a workpiece 14. The electrode has a similar shape in cross section.

In accordance with the present invention, the single electrode 15 is mounted for orbital movement in a plane transverse to the vertical axis of advance of the machine ram 10 with respect to the workpiece 14. At the top of the workpiece the orbit is relatively large. As the cavity deepens the orbit is made progressively smaller so that the sides of the cavity have a taper 13, as indicated in FIG. 7, conforming exactly to the draft requirements of the mold. The same electrode 15 also produces the finishing cut. Accordingly, a single electrode 15 will perform all of the functions of the multiple electrodes required by the prior art.

In accordance with the present invention, the electrode holder comprises a shuttle block 16 to which the electrode 15 is attached by the clamp assembly 17. In one embodiment assembly 17 comprises a V-shaped angle bracket 18 welded on edge to face plate 19 releasably secured by screws 20 to the shuttle block 16. Each leg of the angle bracket 18 carries arms 21 with thumb screws 28 by which the electrode is releasably clamped into the angle of bracket 18.

Shuttle block 16 is mounted in ways for universal movement in a horizontal plane. As best shown in FIGS. 1 and 3, the ways comprise two pairs of slide rods 22 and 27. Slide rods 22 are free for limited axial movement in ball bearing sleeves 23 which are mounted on the frame 24 of electrode holder housing 32. Slide rods 22 support a carriage 25 which is accordingly free to move on the axis of the slide rods 22. Carriage 25 supports ball bearing sleeves 26 in which a pair of transverse slide rods 27 are mounted. Slide rods 27 directly support the shuttle block 16 for movement on the axis of slide rods 27.

Accordingly, the shuttle block 16 is free to move universally in all directions on the transverse axes of slide rods 22, 27, but it cannot rotate.

A driver is provided to impart motion to the shuttle block 16 and to urge it to move it in all directions. The driver comprises a rotor 30 mounted on ball bearings 21 in electrode holder housing 32. The top of housing 32 is releasably engaged by the chuck 29 of ram 10. The rotor 30 carries an external worm wheel 38 which meshes with the drive worm 33 connected through a coupling 34 to a flexible drive shaft 35 from a suitable drive unit (not shown). Coupling 34 and associated parts are provided with insulation material to electrically insulate shaft 35 from the electrode and associated parts.

The rotor has a central cavity 36 into which projects a bearing post 37 projecting upwardly from its fixed connection to block 16. Bearing post 37 carries at its top a roller 40 which is received into a guide groove 41 in the side of a drive arm 42 which is pivotally connected by a pivot pin 43 to the rotor 30. Post 37 and electrode 15 are electrically energized through flexible cable 39.

Energy storing resilient spring 44 urges the arm 42 into contact with the roller 40 and urges the post 37 and attached shuttle block away from the axis of rotation of rotor 30 and toward the side of the rotor 30 which is opposite spring 44. Accordingly, when rotor 30 is turned counterclockwise, as shown in FIG. 2, arm 42 will impose thrust on the post 37 in a direction normal to the arm 42 and urge the shuttle block 16 successively in all compass directions toward which the arm 42 faces.

Figure 2:
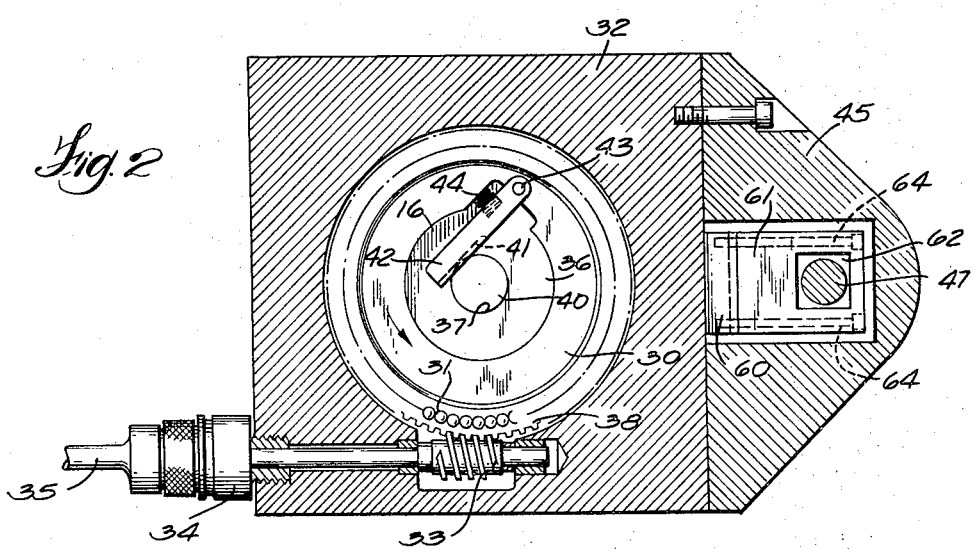
FIG. 2 is a horizontal cross section taken along the line 2—2 of FIG. 1.

The precise path of the orbit through which the shuttle block 16 and attached electrode 15 will follow, however, is controlled by the orbit control mechanism shown at the right at FIGS. 1 and 2. Projecting outwardly from the electrode holder frame 32 is an arm 45 which carries a vertically extending bore 46 for a vertically adjustable elongated guide rod 47. Near its bottom the housing 49 is provided with a ball bearing bushing 48 and near its top housing 49 is provided with a ball bushing 51 for relatively frictionless movement of the guide rod 47.

Guide rod 47 may be clamped in any set position by the clamp ring 52 which is threaded to the threads 53 on the housing 49. Collar 52 has a conical cam surface 54 which bears on three equally angularly spaced locking balls 55 which are captive in corresponding sockets 56 in the side wall of the housing 49. Downward movement of the collar 52 on its threads 53 will cam the balls 55 against the guide rod 47 and clamp it in fixed position. Release of the collar 52 will permit vertical adjustment of the guide rod 47.

A portion of the guide rod 47 is tapered at 57. For a typical draft in a workpiece intended to function as a mold in a die casting machine, the taper of portion 57 of the guide rod 47 will be approximately three degrees.

The shuttle block 16 has a laterally projecting arm 60 which has a replaceable tip end 61 with an orbit defining regular polygonal hole 62 in alignment with the guide rod 47 and through which the guide rod extends. Hole 62 has a regular polygonal configuration which will establish the precise orbit of the shuttle block 16 and electrode 15 under drive of the rotor arm 42. In the embodiment shown in FIGS. 1 and 2, hole 62 is square. It has rectilinear sides of equal length and angular corners. For reasons hereinafter explained, the four sides or edges of hole 62 are of equal length. Thus the orbit on which the electrode is driven will be square and will conform to the shape of the hole. Other regular polygons, such as triangles, hexagons, octagons, etc., can also be utilized for the shape of the orbit defining hole 62.

The replaceable tip 61 is connected to arm 60 on a tongue and groove coupling 63. Tip 61 is fastened to the arm by longitudinal bolts 64, the removal of which will enable removal of the tip 61 and the substitution of other tips such as tips 65, 66 fragmentarily shown in FIGS. 4 and 5. The purpose of substituting a different tip is to substitute holes of different configurations, thus to change the orbit of the electrode holder and electrode. In FIG. 4 the hole 67 is circular and in FIG. 5 the hole 68 is triangular. The circular hole 67 of FIG. 4 is useful only where curved corners can be tolerated in the eroded cavity. It is applicable primarily in machining cavities with a circular cross section. This invention, however, relates to the production of polygonol cavities with rectilinear sides and angular corners. Hence, a polygonal hole configuration is essential. Inasmuch as a square hole will serve to orbit the electrode to cut hexagon and octagon shapes, as well as square shapes or irregular polygon shapes with square corners, as shown for example in FIG. 9, the square hole 62 will suffice for most applications of this invention.

The square hole 62, as shown in FIG. 2, has straight edges intersecting at ninety degree angles. These edges will slide on the tapered periphery 57 of the guide rod 47. Accordingly, as the rotor 30 turns, the electrode 15 will be required in the square hole embodiment of FIG. 2 to follow a square path or orbit determined precisely by the size and configuration of the square hole 62 relative to the size and configuration of the guide rod 47. To cut a hexagon shape a hexagon-shaped hole would be used or a square hole would be used, but in the latter case, three successive overlapping cavities would be cut. To cut an octagon shape, an octagon-shaped hole would be used, or a square hole would be used, cutting four overlapping cavities.

With the guide rod 47 in its vertically adjusted position shown in FIG. 1, there will be relatively little clearance between the guide rod and the square hole 62. Accordingly, the electrode 15 will have a very small square orbit. However, if the rod 47 is moved downwardly in its bore 46 so that a narrower cross section of the taper 57 is within the hole 62, there will be greater clearance between the guide rod and the sides of the hole 62. Accordingly, the electrode will move on a larger square orbit when the rotor 30 is turned. Thus it is clear that the size of the orbit will progressively change as the guide follower 61 moves vertically relative to the guide rod 47. Spring 44 behind arm 42 will yield and expand to store and release energy to accommodate for the size and shape of the orbit defined by the configuration of hole 62.

The electrode and holder will move intermittently on its polygonal orbit, with relatively quick rectilinear motion along the straight sides of the polygonal path and relatively long intervening dwell in the angular corners of said polygonal path. Accordingly, little machining time is expended during electrode motion. Virtually all machining time is expended during said dwell. This feature is important to achievement of balanced removal of stock from all surfaces of the cavity and true vertical descent of the electrode into the cavity.

In the disclosed embodiment of the invention, this intermittent rectilinear motion with intervening dwell is achieved as illustrated in FIG. 11.

Rotation of rotor 30 as viewed, for example, in FIG. 2, imposes the force F of drive arm 42 on post 37 in a direction substantially normal to the length of the arm 42. Accordingly, as viewed in FIG. 2, the post will be urged to move downwardly and to the right as shown in this figure. This is also illustrated diagrammatically in FIG. 11A, which corresponds to FIG. 2, but which shows the electrode 15 centered in cavity 13 and guide rod 47 centered in orbit defining hole 62. Force F will move the electrode to its FIG. 11B position, at which point the guide rod 47 engages the upper left corner of the square hole 62 and the shuttle block and electrode are driven into and will dwell in the lower right-hand corner of the cavity 13 in the workpiece. Dwell in this position continues until rotor 30 has turned counter-clockwise in FIG. 2 far enough so that force F exerted by arm 42 on post 37 is approximately as shown in FIG. 11C. At this point the guide rod 47 and electrode 15 will respectively move out of the corner of the hole 62 and cavity 13 in which they have been resting. Electrode 15 will move quickly into the upper right-hand corner of the cavity 13 along a rectilinear path as indicated by arrow 100, as illustrated in FIG. 11C, where the parts will again dwell until rotor 30 has turned far enough so that the force F is approximately as shown in FIG. 11D.

At this point the electrode 15 will move from its position shown in FIG. 11C along the rectilinear path of arrow 101 into the upper left-hand corner of the cavity 31, as shown in FIG. 11D, where it will dwell. Concurrently, the position of guide rod 47 with respect to hole 62 is shifted from its position shown in FIG. 11C to its position shown in FIG. 11D.

The parts will dwell in their FIG. 11D position until the rotor 30 has turned far enough so that the force F is approximately as shown in FIG. 11E, whereupon electrode 15 will move on the rectilinear path of arrow 102 into the lower left-hand corner of cavity 13 and guide rod 47 will then be disposed in the upper right-hand corner of hole 62, as shown in FIG. 11E. The parts will dwell in this position until the rotor 30 has turned far enough so that it is again in the position shown in FIG. 11B at which time the electrode will move along the rectilinear path of arrow 103 and into the lower right-hand corner of the cavity, guide rod 47 then being disposed in the upper left-hand corner of the hole 62 as shown in FIG. 11B.

The rectilinear movements of the electrode from one corner of the cavity to the next are relatively quick and the intervening dwell periods between such rectilinear movements are relatively long. The precise time periods and speed of movement depend upon various factors, such as the speed of the input drive 35 (FIG. 2), the friction between the guide rod 47 and edges of hole 62, friction in bearings 23, etc. In a typical instance, however, 99 percent of the total time of the orbit movement of the electrode will be spent in corner dwell and the other 1 percent will be spent in rectilinear movement from one corner to the next. Accordingly, essentially all of the EDM action of the electrode occurs while the electrode dwells in a corner of the cavity, thus to produce a clean cut angular corner of the exact shape of the electrode corner.

In order to accomplish this intermittent motion with interventing dwell, the driver for the electrode holder must be capable of exerting motive force F on the electrode holder throughout the length of said rectilinear motions, indicated diagrammatically by arrows 100, 101, 102 and 103, and must also be capable of remaining motionless with respect to the electrode holder during said dwell periods, even though rotor 30 is turning at a constant rate at all times.

In the disclosed embodiment, this facility is achieved by reason of the resilient load absorbing and releasing spring 44 which loads the pivotal arm 42 which transmits motion from the rotor 30 to the post 37. The movement of the rotor 30 is continuous, but the movement of the electrode holder or shuttle block 16 is intermittent. When the electrode is in the corner of the workpiece cavity and is not moving with respect thereto, the continuous rotation of the rotor 30 causes arm 42 to pivot counterclockwise in FIG. 2 about its pin 43 and energy to be stored in the spring 44. When the electrode is moving on its rectilinear path from one corner to the next, spring 44 releases stored energy to the arm 42, thus to pivot the arm 42 clockwise in FIG. 2 about its pin 43 and advance the electrode quickly from one corner to the next, whereupon the drive arm 42 will again become motionless during the dwell period of the electrode and spring 44 will again store energy. Accordingly, spring loaded arm 42 may be characterized as a motor which successively stores and releases energy to the electrode holder.

The aforedescribed facility of the electrode to move intermittently on rectilinear paths into the corners and to dwell in the corners assures reproduction in the cavity of the identical angular corner configuration of the electrode. Virtually the entire machining time of the electrode is spent with the electrode in the corners of the cavity.

To produce a cavity 13 with a 3° draft, as shown in FIG. 7, the guide rod 47 is formed with a 3° taper at 57 and is adjustably positioned in the housing 45 in the following manner.

Figure 8:
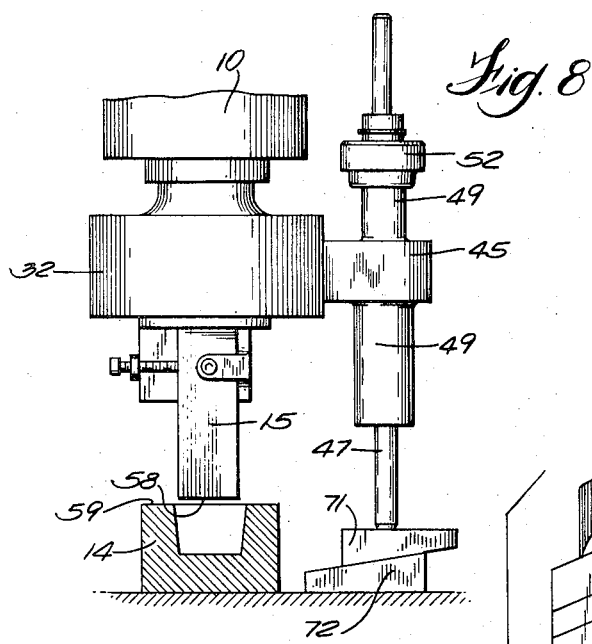
FIG. 8 is a view on a reduced scale similar to FIG. 7 and showing an alternative embodiment of apparatus, including adjustable parallels for setting the position of the tapered rod.
Figure 10:
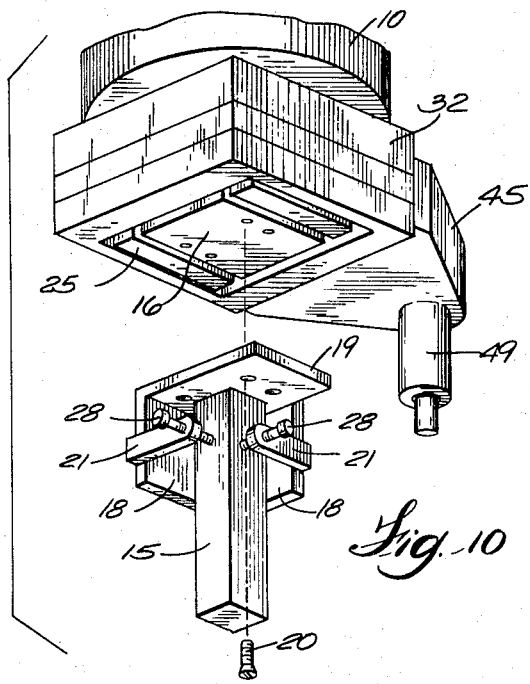
FIG. 10 is an exploded bottom perspective view of the electrode holder.

The tip 58 of the electrode 15 is bottomed on the top 59 of the uncut workpiece 14, as illustrated in FIG. 8. At this position, either using the sliding parallels 71, 72 shown in FIG. 8, or the suspension measuring apparatus 73 shown in FIG. 7, the rod 47 is raised to its position shown in FIG. 1 in which its maximum diameter is laterally aligned with the square hole 62 in the shuttle block arm extension 61. In practice, the diameter of rod 47 equals the length of one side of hole 62. Accordingly, rotation of the rotor 30 is ineffective to produce any orbital movement whatever of the electrode, because the rod 47 locks the shuttle block against any movement. Rod 47 is now lowered a distance exactly equal to the desired depth of cavity 13. This can be accomplished by adjusting the parallels 71, 72 to lower the rod 47 this required distance. In the embodiment of FIG. 7, the exact distance can be measured between stop bracket 77 on the frame 78 of the machine and a locking collar 75 on support rod 76. A micrometer 74 assists in this measurement. The rod 47 is then lowered until collar contacts the top of stop bracket 77.

When the rod 47 is thus lowered to its new level established by the adjustable parallels 71, 72, or until the collar 75 bottoms on the bracket 77, a reduced diameter portion of the taper 57 on guide rod 47 will now be within the hole 62. Accordingly, rotation of the rotor 30 will be effective to move the electrode 15 on its longest orbit at the top of the workpiece.

The machine 78 is operated in its normal manner and at a rate of descent of ram 10 which is appropriate for the workpiece. At the same time, the drive shaft 35 is continuously powered to orbit the electrode on its orbit as established by the configuration of hole 62 and its relation to the rod taper 57. As the rod 47 is now locked in vertical position by the adjustable parallels 71, 72 (FIG. 8) or the locking collar 75 (FIG. 7), progressive downward movement of ram 10 will gradually advance the electrode into the workpiece on successively smaller orbits transverse to the direction of ram advance. This reduction in orbit size is because as the guide follower 61 follows down the taper 57, its hole 62 will embrace larger and larger cross sections of the rod 47, thus progressively reducing the orbit. This action creates the tapered form or draft on the side walls of cavity 13, as shown in FIG. 7. When the electrode 15 has reached the bottom of its cut, it will not be orbiting at all. Accordingly, a single electrode 15 will be effective to produce the tapered cavity 13.

The same electrode can also be used to make a rough cut and a finished cut. After a rough cut has been made as aforedescribed, the cut is repeated, except that the guide rod 47 is set slightly lower in its bore 46. This will produce slightly larger orbits at each level in the cavity as the ram descends, thereby removing more metal and finishing the cut.

Even if the cavity 13 does not have a taper, for example, when no draft is required, the same electrode 15 can be used for both the rough and finished cut. The rough cut will be made with the guide rod 47 at a position in its bore 46 where the electrode 15 will not orbit at all. Rod 47 is desirably clamped or locked tightly in its tubular housing 49 by the locking ring 52 with hole 62 in snug contact with the sides of rod 57. After the vertical rough cut is complete, the rod 47 will be adjusted downwardly slightly to produce a slight clearance between the side walls of hole 62 and rod taper 57. The rod will again be locked to its housing 49 by the locking bushing 52 and the finished cut will be made with a slight orbital movement of the electrode, thus to remove slight additional amount of metal from the workpiece.

Inasmuch as the amount of stock removal in the electric discharge machine technique is dependent upon surface area exposure of the electrode to the workpiece related to time, it is important that surface exposure be identical in all positions of electrode movement. Accordingly, the polygonal configuration of the orbit defining hole, such as hole 62, will automatically result in erosion of the same amount of material from the bottom of the cavity, in each position of the electrode, regardless of the shape of the cut. This is illustrated in FIG. 9, where the outline of the cavity 13 has irregular boundaries. The cross section of the electrode 15 has a similar irregular cross section. The square hole 62 requires the electrode to successively advance on rectilinear paths with effective components of forces on the electrode represented by the arrows 87, 90, 93 and 95. During substantially the entire time span of each force component, the electrode is in its dwell position in the corner toward which the arrow points. During imposition of force in the direction of arrow 87 the electrode 15 will be adjacent workpiece surfaces 80, 81, 82, 83, 84, 85 and 86 and will erode metal from the bottom of the cavity adjacent these surfaces and substantially uniformly over that portion of the bottom of the cavity opposite the end of the electrode. In the configuration shown in FIG. 9, with the indicated dimensions, the total lineal extent of these surfaces is twelve inches.

With the driven force component effectively in the direction of arrow 90, the surfaces 81, 84, 86 and 92 will be adjacent the electrode and the bottom of the cavity adjacent these surfaces and opposite the bottom of the electrode will receive cutting action. The total lineal distance of these surfaces is also 12 inches.

With the driven force component effectively in the direction of arrow 93, the surfaces 91, 92 and 94 will be adjacent the electrode and the bottom of the cavity adjacent these surfaces will be acted upon, the lineal extent of these surfaces again being 12 inches.

With the driven force component effectively in the direction of arrow 95, surfaces 94, 80, 82, 91, 83 and 85 will be adjacent the electrode and the bottom of the cavity adjacent these surfaces will be acted upon, the total lineal extent of these surfaces again being 12 inches. Accordingly, the square configuration of hole 62 automatically results in the same exposure to the electrode 15 of all cut surfaces in each compass direction of electrode movement during the orbit. Accordingly, no more metal is removed from one side of the cavity than from another, and the electrode will descend on a true vertical axis, with no side drift.

I claim:
1. In an electric discharge machine having an electrode holder and means for advancing an electrode mounted in said holder toward a workpiece to produce a cavity therein, the improvement for eliminating the need for repeated replacement of the electrode as the cavity is deepened, for forming angular corners in said cavity, and for eroding corresponding amounts of material from all portions of the bottom of the workpiece cavity regardless of the shape thereof, said improvement comprising means for orbiting the electrode holder on a regular polygonal path having straight sides of equal length and angular corners in a plane transverse to its advance and reducing the size of the orbit in the course of said advance, said means comprising drive means for driving said electrode holder intermittently with rectilinear motion along the straight sides of said polygonal path during which virtually none of the electric discharge machine action of the electrode occurs and intervening dwell in the corners of said polygonal path during which virtually all of the electric discharge machine action of the electrode occurs.

2. The improvement of claim 1 in which the means for reducing the size of the orbit comprises a vertically elongated tapered guide rod, said electrode holder having a guide follower with a regular polygonal hole through which the rod is received.

3. The improvement of claim 2 in which the electrode holder comprises a shuttle block mounted for universal movement, said drive means comprising means for driving the block successively in all directions in said transverse plane, whereby the block will move in the polygonal orbit established by the polygonal configuration of said hole.

4. The improvement of claim 3 in which the means for driving the block comprises a rotor having a drive arm, said electrode holder having a post engaged by the arm and by which the electrode holder tends to be moved universally as the rotor turns.

5. The improvement of claim 4 in which the post has a roller, said arm having a groove into which the roller fits.

6. The improvement of claim 4 in combination with means yieldably mounting the arm on the rotor, whereby to accommodate for variations in the size and shape of orbit.

7. The improvement of claim 1 in which said polygonal path is square.

8. The improvement of claim 1 in which said drive means comprises a motor for releasing force to the electrode holder for its said intermittent rectilinear motion.

9. The improvement of claim 8 in which said motor comprises a rotor, a resiliently loaded drive arm on the rotor and a post on the electrode holder, the rotation of the rotor causing the resiliently loaded drive arm to release energy to the electrode holder during its rectilinear motion and to store energy during its dwell.

* * * * *